(12) United States Patent
Larson

(10) Patent No.: US 7,412,336 B2
(45) Date of Patent: Aug. 12, 2008

(54) ATTITUDE INSENSITIVE FLOW DEVICE SYSTEM AND METHOD

(75) Inventor: Dwight S. Larson, Allen, TX (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 11/788,201

(22) Filed: Apr. 19, 2007

(65) Prior Publication Data

US 2007/0260412 A1 Nov. 8, 2007

Related U.S. Application Data

(63) Continuation of application No. 10/887,048, filed on Jul. 8, 2004, now Pat. No. 7,222,029.

(51) Int. Cl.
*G06F 19/00* (2006.01)
*G01F 25/00* (2006.01)

(52) U.S. Cl. .................. 702/45; 702/100; 137/486; 137/487; 73/202; 73/861

(58) Field of Classification Search .............. 702/45, 702/50, 55, 100, 182, 187; 137/12, 486, 137/487; 73/202, 202.5, 861; 700/73, 282
See application file for complete search history.

(56) References Cited

U.S. PATENT DOCUMENTS

| | | | |
|---|---|---|---|
| 3,938,834 A | 2/1976 | Oostenbrink | |
| 4,056,975 A | 11/1977 | LeMay | |
| 4,100,801 A | 7/1978 | LeMay | |
| 4,190,085 A | 2/1980 | Hasa et al. | |
| 4,370,887 A | 2/1983 | Sauer et al. | |
| 4,956,975 A * | 9/1990 | Gustafson | 62/50.7 |
| 5,027,662 A | 7/1991 | Titlow et al. | |
| 5,086,650 A | 2/1992 | Harrington et al. | |
| 5,191,573 A | 3/1993 | Hair | |
| 5,279,154 A | 1/1994 | Vavra et al. | |
| 5,672,832 A | 9/1997 | Cucci et al. | |
| 5,763,774 A | 6/1998 | Ha et al. | |
| 5,952,584 A | 9/1999 | Strubbe | |
| 5,970,802 A | 10/1999 | Strubbe | |

(Continued)

FOREIGN PATENT DOCUMENTS

EP    0642000 B1    3/1995

(Continued)

OTHER PUBLICATIONS

International Search Report of Application No. PCT/US05/24085, dated Nov. 18, 2005.

(Continued)

*Primary Examiner*—Bryan Bui
(74) *Attorney, Agent, or Firm*—Lowrie, Lando & Anastasi, LLP

(57) ABSTRACT

Disclosed herein are systems and methods for attitude insensitive flow devices. The system can include a flow device having a processor and a computer readable medium accessible by the processor that stores a set of computer instructions executable by the processor. The computer instructions can include instructions executable to receive an orientation signal, receive a sensed flow signal, and determine a flow through the flow device based on the sensed flow signal and the orientation signal.

20 Claims, 5 Drawing Sheets

U.S. PATENT DOCUMENTS

| | | |
|---|---|---|
| 6,044,701 A | 4/2000 | Doyle et al. |
| 6,138,518 A | 10/2000 | Strubbe |
| 6,272,935 B1 | 8/2001 | Strubbe |
| 6,712,084 B2 | 3/2004 | Shajii et al. |
| 6,763,774 B1 * | 7/2004 | Ranieri et al. ............ 114/76 |
| 6,813,964 B1 * | 11/2004 | Clark et al. ............ 73/861.52 |
| 6,845,659 B2 | 1/2005 | Lull |
| 7,000,465 B1 | 2/2006 | L'Bassi et al. |
| 7,222,029 B2 | 5/2007 | Larson |
| 2007/0174016 A1 | 7/2007 | Ding et al. |

FOREIGN PATENT DOCUMENTS

| | | |
|---|---|---|
| GB | 2173910 A | 10/1986 |

OTHER PUBLICATIONS

European Search Report of Application No. 05772203.5, dated Jun. 12, 2007.

* cited by examiner

ATTITUDE INSENSITIVE FLOW DEVICE SYSTEM AND METHOD

CROSS-REFERENCE TO RELATED APPLICATIONS

The present application is a continuation application under 35 U.S.C. § 120 of commonly owned, copending application Ser. No. 10/887,048, entitled "Attitude insensitive flow device system and method," filed Jul. 8, 2004 now U.S. Pat. No. 7,222,029.

TECHNICAL FIELD OF THE INVENTION

Embodiments of the present invention relate to the field of flow control. More particularly, embodiments of the present invention relate to systems and methods for an attitude insensitive flow device.

BACKGROUND OF THE INVENTION

The manufacture of semiconductors typically requires precise control of fluids (e.g., gasses, liquids, gas-vapor mixes) through the process path to a process chamber. Regulation of mass flow is often achieved through the use of a thermal mass flow controller. These mass flow controllers generally operate by directing fluid flow through a capillary tube path that runs parallel to a bypass area of the main flow path. Two thermally sensitive resistors are wound around the capillary tube. As fluid travels through the capillary tube, heat is conducted away from the resistors, or imparted to the fluid, causing the resistance of each of the resistors to change and the temperature of the fluid to change. Based on the difference in resistance between the two resistors, a controller, executing a control algorithm can determine the flow through the mass flow controller. Many mass flow meters work on a similar principle.

Thermal mass flow controllers and meters, such as those described above, are subject to a phenomenon known as "thermal siphoning" wherein heated fluid in the capillary tube initiates convective flow with the cooler fluid in the main flow path. While this flow may be small, it can cause measurable changes in the zero of the mass flow controller. This problem is exacerbated if the attitude (i.e., angle from the horizontal of the main flow path) changes. Because of thermal siphoning, prior art mass flow controllers must typically be calibrated on a controller-by-controller basis for the orientation in which each mass flow controller will be installed.

Several schemes for attitude compensation have been developed to try to offset the effects of thermal siphoning. U.S. Pat. No. 5,763,774 describes a system for minimizing thermal siphoning by reducing the internal volume of the capillary tubes and bypass area. While this method reduces the effects of thermal siphoning, a small amount of thermal siphoning remains.

Another prior art system for addressing thermal siphoning is to increase the flow restriction in the bypass area and/or the capillary tube area, as described in U.S. Pat. No. 6,763,774. This method can adversely affect sensing in some applications because it increases the differential pressure required across the sensing element.

U.S. Pat. No. 6,044,701 describes another prior art method for addressing thermal siphoning. In this scheme, the capillary tube is orthogonal to the main axis of flow through the flow measurement/control device. This method requires a complicated flow path that is difficult to manufacture. Moreover, this method simply reorients the axis of the capillary tube ninety degrees and will experience the same difficulties as other flow measurement devices if installed in an orientation that is rotated ninety degrees around the main axis of flow relative to the intended installation orientation.

U.S. Pat. Nos. 4,100,801 and 4,956,975 describe a method for reversing the flow path. While this system acts to reduce the effects of thermal siphoning, mass flow measurement/control devices incorporating this system can be more expensive to manufacture. Moreover, reversing the flow path, or even making the flow path orthogonal to the main flow path through the thermal mass flow sensor, can increase the internal volume of the thermal mass flow sensor. The increase in internal volume can make the device unsuitable for use in systems with low vapor pressure.

SUMMARY OF THE INVENTION

Embodiments of the present invention provide an attitude insensitive flow device system and method that eliminates, or at least substantially reduces, the shortcomings of prior art flow device systems and methods.

One embodiment of the present invention can include a flow device comprising a processor and a computer readable medium accessible by the processor storing a set of computer instructions executable by the processor. The computer instructions can comprise instructions executable to receive an orientation, receive a sensed flow and determine a flow through the flow device based on the sensed flow and the orientation.

Another embodiment of the present invention can include a flow device method comprising determining the orientation of a thermal mass flow sensor, determining a sensed flow and determining the flow through the flow device based on the sensed flow and the orientation.

Yet another embodiment of the present invention can include a computer program product comprising a computer readable medium accessible by the processor, storing a set of computer instructions. The set of computer instructions can comprise instructions executable to receive an orientation, receive a sensed flow and determine a flow through a flow device based on the sensed flow and the orientation.

Yet another embodiment of the present invention can include a mass flow controller that has a thermal mass flow sensor with an inlet, an outlet, a bypass area in fluid communication with the inlet and outlet, a capillary tube in fluid communication with the bypass area, an upstream sense element and a downstream sense element to sense flow in the capillary tube. The mass flow controller can further include sensor logic connected to the upstream sense element and downstream sense element that outputs a sensed flow and an orientation sensor that outputs an orientation of the thermal mass flow sensor. The mass flow controller can also include a processor that receives the sensed flow and the orientation, a computer readable medium accessible by the processor and a set of computer instructions stored on the computer readable medium. The set of computer instructions can comprise instructions executable to receive the sensed flow, receive the orientation, select an offset based on the orientation, derive an indicated flow based on the sensed flow and offset, receive a set point and generate a valve control signal based on a difference between the indicated flow and the set point.

Embodiments of the present invention provide a technical advantage over prior art mass flow controllers by compensating for thermal siphoning with no or minimal increase to the internal volume of the flow device. Because the internal volume of the flow device is not increased, flow devices according to the present invention can be used in low vapor pressure delivery systems.

Embodiments of the present invention provide another advantage by allowing the same mass flow controller to be installed in a variety of orientations.

Embodiments of the present invention provide yet another advantage as the device orientation can be a software accessible parameter that can be used in diagnostics.

BRIEF DESCRIPTIONS OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Embodiments of the present invention provide a system and method for attitude insensitive flow controllers. Embodiments of the present invention can include a flow device with a controller for determining flow. The controller can include an orientation sensor that is sensitive to the angle of the flow device. Based on the reading of the orientation sensor, the controller can apply a predetermined offset to flow measurements to account for thermal siphoning.

Figure 1:
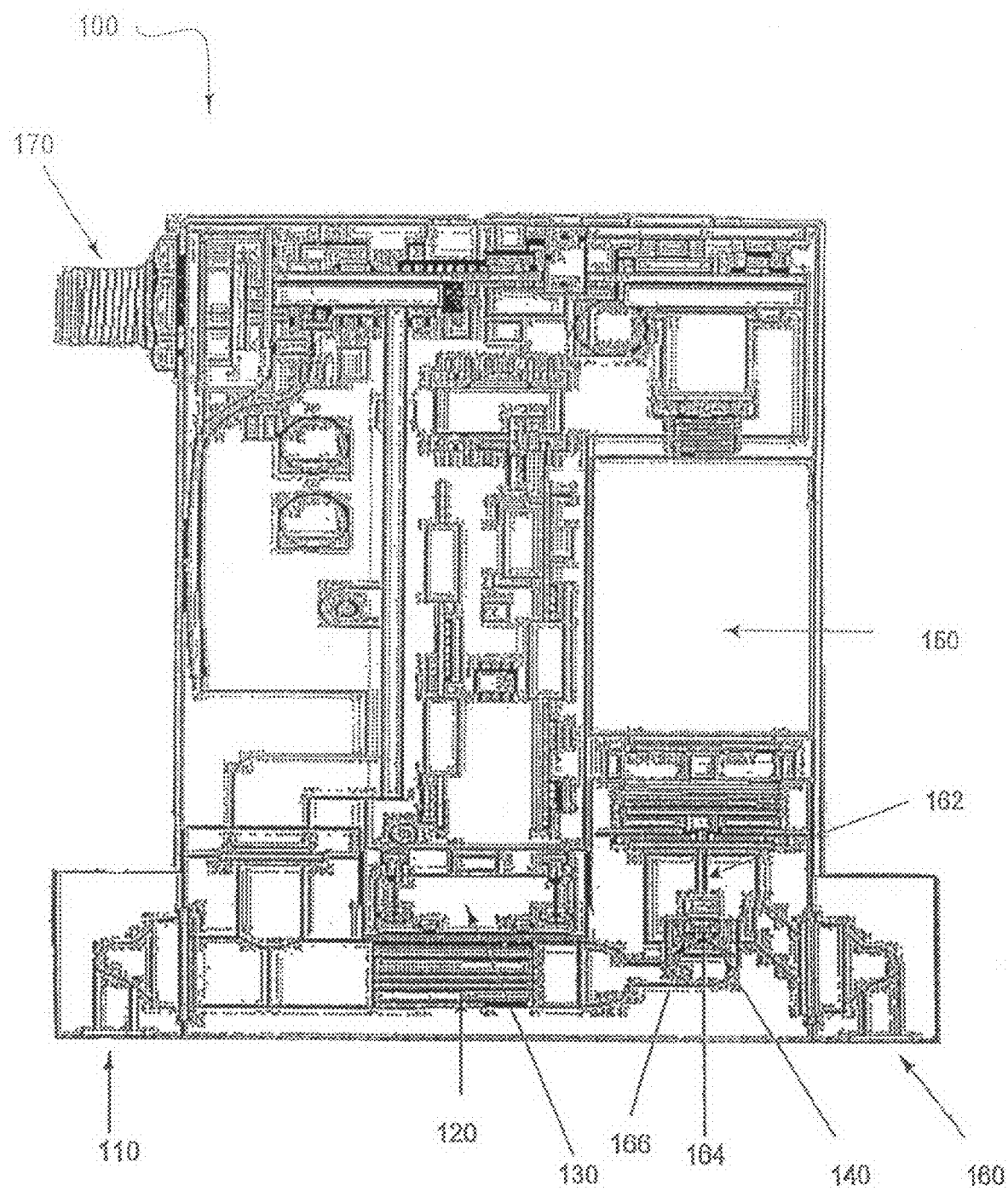
FIG. 1 is a diagrammatic representation of a flow control device.

FIG. 1 is a diagrammatic representation of one embodiment of a flow controller. Mass flow controller 100 comprises inlet fitting 110, flow restrictor 120, thermal mass flow sensor 130, control valve 140, solenoid 150, outlet fitting 160, and I/O coupling 170 for communicating with a control system or process management system. Thermal mass flow sensor 130, which can include upstream and downstream resistors, and solenoid 150 may be coupled to an embedded control system. The control valve is driven by a current controlled solenoid valve drive circuit.

Fluid (e.g., gas, liquid, gas-vapor mix) enters mass flow controller 100 through inlet fitting 110 and flows through flow restrictor 120, control valve 140 and outlet fitting 160. The volume of fluid flowing through outlet fitting 160 is controlled by control valve 140, which is in turn controlled by solenoid 150. The embedded control system monitors the set point input and flow sensor output(s). A control algorithm, such as a closed loop control algorithm executed by the embedded control system, operates to output a valve control signal to solenoid 150. In response to the valve control signal, solenoid 150 exerts a force on valve stem 162 to move poppet 164 away from valve seat 166. The mass flow controller of FIG. 1 is provided by way of example only, and embodiments of the present invention can be implemented in a variety of mass flow controllers including those described in U.S. patent application Ser. No. 10/886,836, entitled "Method and System for a Mass Flow Controller with Reduced Pressure Sensitivity", filed Jul. 8, 2004 (Attorney Docket No. MYKR1490), now allowed, by Kenneth E. Tinsley et al., which is hereby fully incorporated by reference herein, (hereinafter the "Reduced Pressure Sensitivity Application").

Figure 2:
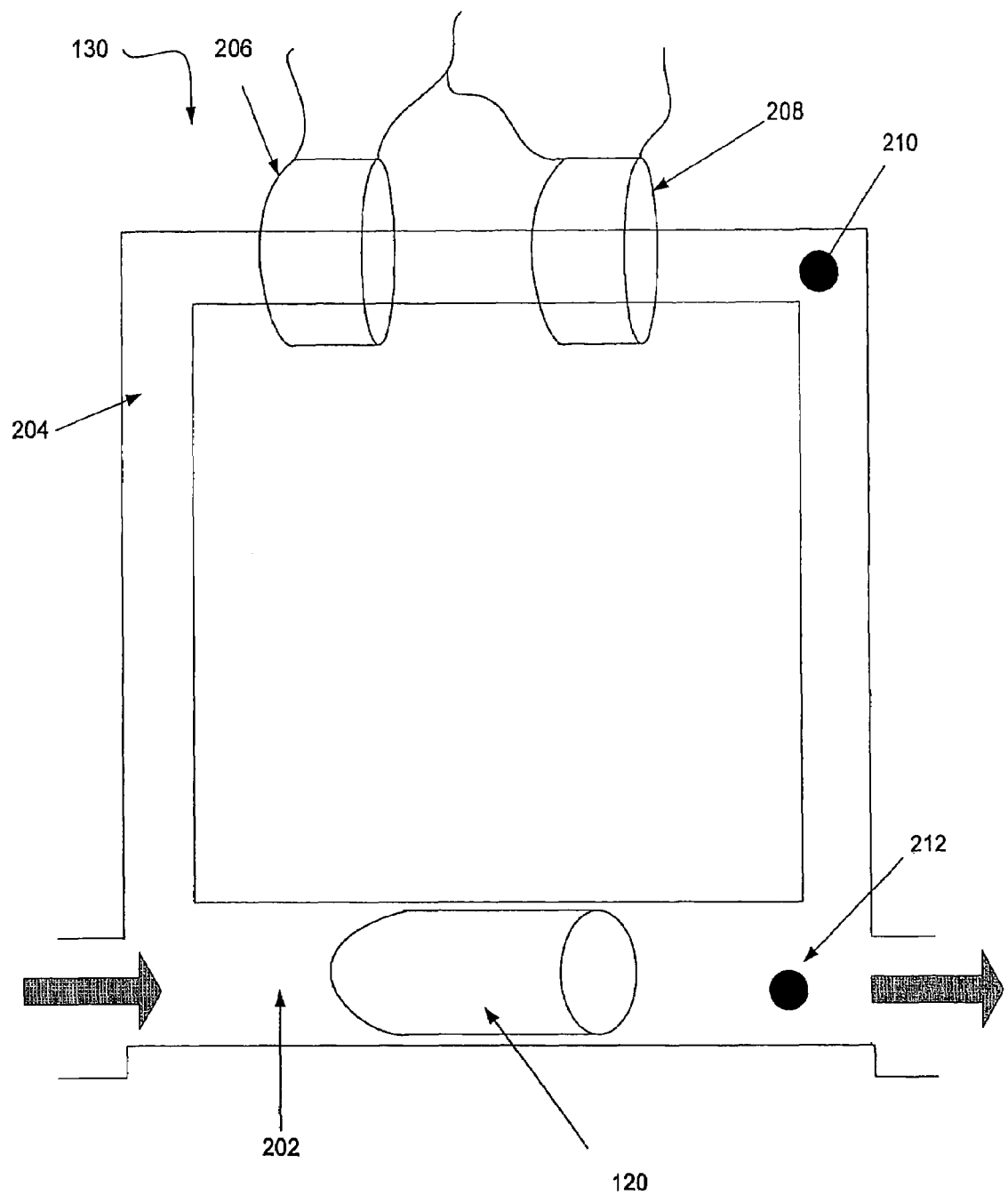
FIG. 2 is a diagrammatic representation of one embodiment of a thermal mass flow sensor.

FIG. 2 is a diagrammatic representation of one embodiment of a thermal mass flow sensor 130. Thermal mass flow sensor 130 can include, for example, a bypass region 202 and a capillary tube 204. Bypass region 202 can include a flow restrictor 120. According to one embodiment of the present invention, flow restrictor 120 can produce a generally laminar flow through bypass region 202. Capillary tube 204 can be surrounded by an upstream sense element 206 and a downstream sense element 208 that can be connected to additional logic. As fluid enters thermal mass flow sensor 130, a portion of the fluid is diverted through capillary tube 204. The fluid is heated by upstream sense element 206 and downstream sense element 208, which creates a region of heated fluid 210. The fluid flow through bypass region 202, on the other hand, can remain relatively cool to create a region of cool fluid 212. As heat is drawn away from upstream sense element 206 and downstream sense element 208 the resistance of the sense elements changes. Based on the difference in resistances, the flow through flow sensor 130 can be determined.

In the embodiment illustrated in FIG. 2, the main axis of flow through thermal mass flow sensor 130 is approximately horizontal. As the attitude of the mass flow sensor 130 changes, that is, as the main axis of flow deviates from the horizontal, convective flow can be established in capillary tube 204 through the temperature differences of the fluid in flow sensor 130. This convective flow can cause the temperature change in upstream sense element 204 and downstream sense element 206 to inaccurately reflect the net flow through thermal mass flow sensor 130. Generally, the convective flow will cause the sensed net flow to be offset by some amount. The amount of offset is influenced by the orientation of thermal flow sensor 130, the pressure of the process fluid and the type of process fluid. According to one embodiment of the present invention, the controller to which thermal mass flow sensor 130 is connected can compensate for the convective flow.

Figure 3:
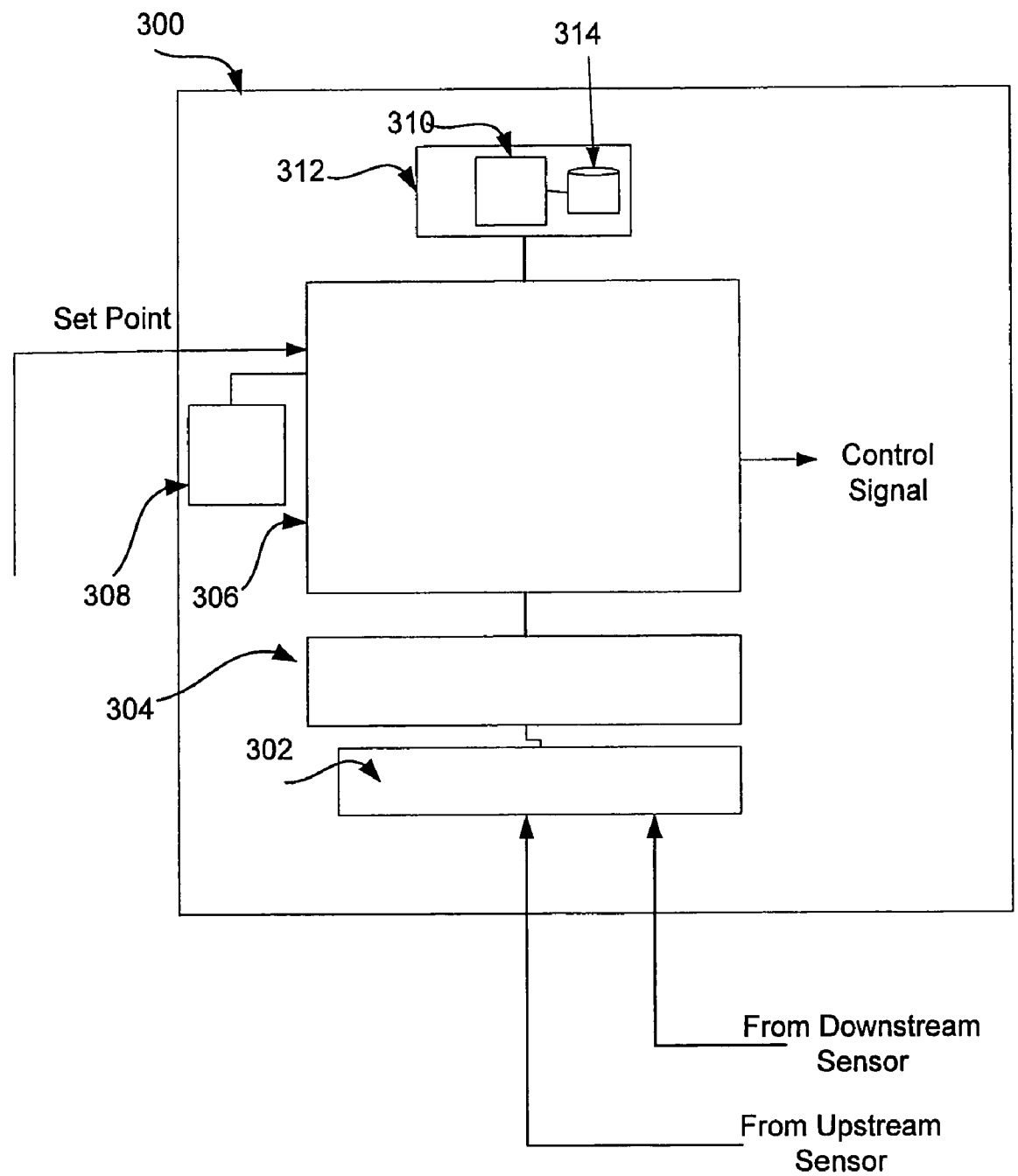
FIG. 3 is a diagrammatic representation of one embodiment of a control system.

FIG. 3 is a diagrammatic representation of one embodiment of a control system 300 that can include logic (hardware and/or software programming) to compensate for thermal siphoning. Control system 300 can include sensor logic 302 connected to the upstream and downstream sense elements. Sensor logic 302 can include any sensor logic known in the art, such as the interface logic of U.S. Pat. No. 6,575,027, entitled "Mass Flow Sensor Interface Circuit", issued Jun. 10, 2003 to Larsen et al., which is hereby fully incorporated by reference herein. Sensor logic 302 can output a sensed flow signal that is generated based on the resistances of the upstream and downstream sense elements. Processor 306 (e.g., CPU, ASIC, or other processor known in the art) can be connected to sensor logic 302 by an analog to digital ("A/D") converter 304. A/D converter 304 can receive the sensed flow signal from sensor logic 302 and convert the received signal to a digital representation of the sensed flow. Processor 306 can receive the sensed flow from A/D converter 304.

Control system 300 can further include an orientation sensor 308. Orientation sensor 308 can include any sensor capable of outputting a signal (analog or digital) that represents the orientation of the thermal flow sensor. One embodiment of orientation sensor 308 is the OMRON D6B position sensor manufactured by OMRON Corporation of Kyoto, Japan. This sensor is a microminiature position sensor that has a 2-bit binary output with distinct states for each of four possible 90-degree orientations around a single axis. The position resolution of the D6B is limited to about +/−fortyfive degrees. The sensor can be positioned such that it outputs the orientation of the main flow axis through the thermal mass flow sensor relative to a horizontal orientation. It should be noted that the OMRON DB6 is provided by way of example only and other sensors, with higher or lower resolutions, can be used for orientation sensor 308. Orientation sensor 308 can be placed on the same circuit board as processor 306 or can be located elsewhere in the flow control device.

Processor 306 can execute computer instructions 310, stored on a computer readable medium 312 (RAM, ROM, Flash Memory, magnetic storage device and/or other computer readable medium known in the art), to correlate the sensed flow to a mass flow or a valve control signal. According to one embodiment of the present invention, processor 306 can access a set of stored offsets 314 and apply the appropriate offset during execution of the control algorithm to account for the orientation of the thermal mass flow sensor.

The offset applied for a particular sensed orientation can be calibrated for a particular mass flow controller. In the example above of an orientation sensor that can indicate four orientations, a mass flow controller can be placed in each of the four orientations (e.g., thermal mass flow sensor inlet up, thermal mass flow sensor inlet down, horizontal with capillary tube up, horizontal with capillary tube down) and the offsets for that mass flow controller can be recorded and saved. According to another embodiment of the present invention, the offsets stored for a particular mass flow controller can be based on offsets determined for other mass flow controllers having, for example, the same combination of valve and restrictor.

It should be noted that offsets can be stored for any number of orientations if the orientation sensor is capable of greater resolution. For example, if the orientation sensor is capable of determining every ten degrees of orientation, control system 300 can store offsets for each orientation (e.g., horizontal, the thermal mass flow sensor outlet elevated ten degrees, the thermal mass flow sensor outlet elevated 20 degrees and so on). Additionally, as the amount of thermal siphoning that occurs is a factor of gas density and pressure, offsets can be stored for a variety of gasses and expected upstream gas pressures. As with calibration flow curves, the offsets for one gas, say Nitrogen, and set of flow conditions can be extended to other gases, Argon for example, and flow conditions. The extension of calibration flow curves to difference gasses and flow conditions is discussed in U.S. patent application Ser. No. 10/444,249, entitled "System and Method for Mass Flow Detection Device Calibration", to Stuart Tison, filed May 23, 2003, which is hereby fully incorporated by reference herein.

Control system 300 can, thus, receive an indication of the thermal mass flow sensor orientation, access a corresponding offset and apply the offset to the control algorithm. The offsets can be applied to the sensed flow, the indicated flow or other point in the control algorithm. This allows embodiments of the present invention to compensate for thermal siphoning without complex rerouting of the capillary tube and further allows for the same mass flow device to be installed in a variety of orientations without recalibration.

Figure 4:
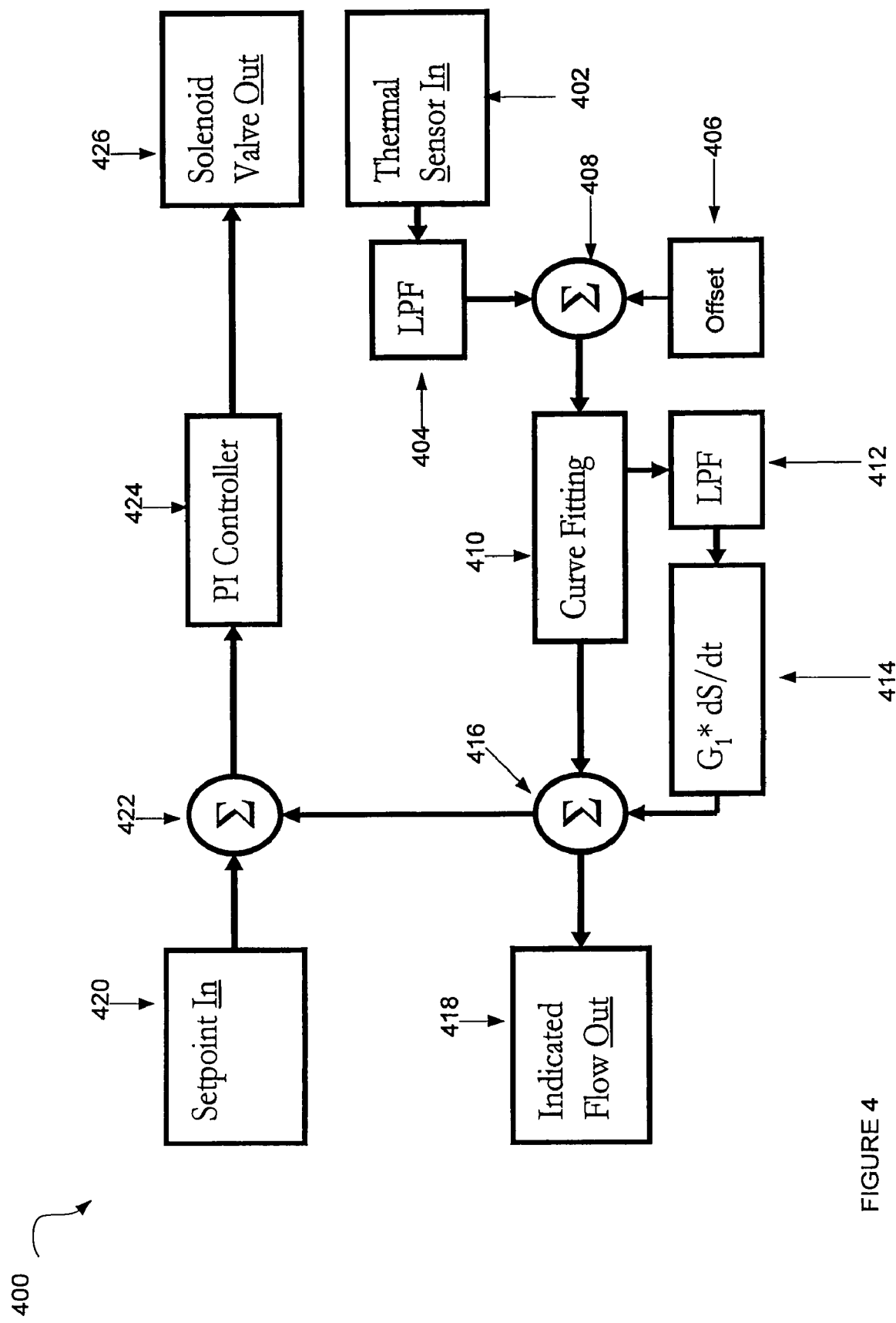
FIG. 4 is a diagrammatic representation of a control algorithm, according to one embodiment of the present invention.

FIG. 4 is a diagrammatic representation of one embodiment of a control algorithm 400. Control algorithm 400 can be implemented, according to one embodiment of the present invention, by executing a set of computer instructions stored on a computer readable medium. According to one embodiment of the present invention, the control algorithm can be executed by an embedded controller of a mass flow control device.

According to one embodiment of the present invention, the controller can receive a digital representation of the sensed flow (block 402) and apply a low pass filter (block 404) to the sensed flow. The controller can further access an offset (block 406). According to one embodiment of the present invention, the offset selected can be based on an orientation received from, for example, an orientation sensor, the gas flowing through the flow device and the pressure of the gas. The controller can add or subtract the offset to the sensed flow (summer 408). Additional values can also be applied to the sensed flow to account for other factors that can contribute to a zero offset.

The sensed flow with the offset applied can be compared to a gas flow curve (block 410). The curves can be stored and accessed according to any mass flow calibration scheme known in the art. The controller can apply a low pass filter (block 412) to the results of the curve fitting and apply a predetermined gain factor to the derivative of the output of the curve fitting (block 414). The results of the curve fitting and the derivative of the curve fitting multiplied by a gain can be combined (summer 416) to produce an indicated flow (block 418).

In a mass flow controller, the controller can receive a set point (block 420) and can subtract the indicated flow from the set point (summer 422) to generate an error signal. The control algorithm can further add a pressure factor (e.g., a second gain multiplied by a change in pressure over time), as described in the Reduced Pressure Sensitivity Application, in generating the error signal. The controller can apply any proportional-integral control technique (block 424) known in the art to generate a valve control signal based on the error signal. The valve control signal can be output to a solenoid controller (block 426). According to one embodiment of the present invention, the controller can output the valve control signal using multiple channels as described in U.S. patent application Ser. No. 10/887,040, entitled "Valve Control System and Method", filed Jul. 8, 2004 (now U.S. Pat. No. 7,133,785), to Dwight Larson, which is hereby fully incorporated by reference herein.

In the example of FIG. 4, the offset is applied to the sensed flow prior to the curve fitting. In this case, the stored offset will be the offset in terms of the sensed flow. According to other embodiments of the present invention, however, the offset can be applied at other points of control algorithm 400. For example, the offset can be applied to the indicated flow or to the valve control signal. According to yet another embodiment of the present invention, the offset can be applied piecemeal at various stages in the control algorithm.

Figure 5:
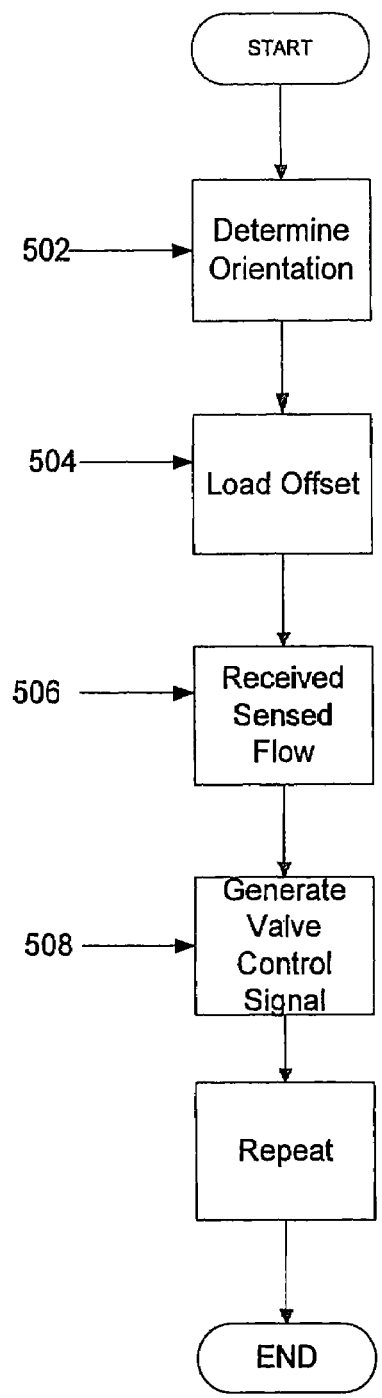
FIG. 5 is a flow chart illustrating one embodiment of a method for measuring flow.

FIG. 5 (is a flow chart illustrating one embodiment of a method for an attitude insensitive flow device. The method of FIG. 5 can be implemented, for example, as hardware or software programming in a controller of a flow device. At step 502, an orientation can be determined. This can be done, for example, when the controller is powered up, when a set point is asserted or at the occurrence of a predetermined event. The controller, at step 504, can load an offset from memory based on the orientation, process gas and expected flow conditions.

The controller, at step 506, can receive a sensed flow from the thermal mass flow sensor. At step 508, the offset determined at step 504 can be applied to the sensed flow to generate a corrected sensed flow. The controller, at step 510, can apply any control algorithm known in the art to the corrected sensed flow generate a valve control signal to open or close a valve in response to a set point. Thus, the controller can receive an orientation, receive a sensed flow and determine a flow through the flow device based on the orientation and the sensed flow. Additionally, the controller can generate a valve control signal based on the sensed flow and orientation. The process of FIG. 5 can be arbitrarily repeated as needed or desired.

Thus, embodiments of the present invention provide a system and method for an attitude insensitive flow device. While the flow device has been discussed primarily in terms of a mass flow controller, the flow device can be any flow device, such as a mass flow meter, that experiences thermal siphoning. According to one embodiment of the present invention, the flow device can include an orientation sensor to determine the orientation of the flow device and a set of stored offsets corresponding to each orientation. Based on the orientation determined by the orientation sensor, the flow device can access the appropriate offset. The offset selected can also be influenced by the process gas and one or more flow parameters (e.g., gas pressure). The flow device can apply the offset to account for thermal siphoning when determining flow through the device.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A flow device comprising:
   a fluid inlet;
   a fluid outlet;
   a flow sensor, in fluid communication with the fluid inlet and the fluid outlet, to sense a flow rate of a fluid through the flow sensor and provide a flow signal indicative of the sensed flow rate of the fluid through the flow sensor;
   an orientation sensor to provide an orientation signal indicative of an orientation of the flow sensor relative to a reference direction; and
   a processor configured to receive the flow signal and the orientation signal and determine a corrected flow rate of the fluid through the flow sensor based upon the flow signal and the orientation signal.

2. The flow device of claim 1, wherein the orientation sensor is capable of identifying at least four distinct orientations of the flow sensor relative to the reference direction.

3. The flow device of claim 2, further comprising:
   a memory, coupled to the processor, to store a plurality of offsets, each offset corresponding to a different orientation of the at least four distinct orientations of the flow sensor relative to the reference direction.

4. The flow device of claim 3, wherein the processor is configured to select an offset from the plurality of offsets based upon the orientation signal, and adjust the flow signal based upon the selected offset to determine the corrected flow rate of the fluid.

5. The flow device of claim 3, further comprising:
   a memory, coupled to the processor, to store a plurality of offsets, each offset corresponding to a particular type of fluid and a different orientation of the at least four distinct orientations of the flow sensor relative to the reference direction.

6. The flow device of claim 5, wherein the processor is configured to select an offset from the plurality of offsets based upon the orientation signal and the particular type of fluid, and adjust the flow signal based upon the selected offset to determine the corrected flow rate of the fluid.

7. The flow device of claim 6, wherein the processor is further configured to select the offset after the flow device is powered up.

8. The flow device of claim 3, further comprising:
   a memory, coupled to the processor, to store a plurality of offsets, each offset corresponding to a different orientation of the at least four distinct orientations of the flow sensor relative to the reference direction, a particular type of fluid, and a pressure upstream of the flow device.

9. The flow device of claim 8, wherein the processor is configured to select an offset from the plurality of offsets based upon the orientation signal, the particular type of fluid, and the pressure upstream of the flow device, and adjust the flow signal based upon the selected offset to determine the corrected flow rate of the fluid.

10. The flow device of claim 9, wherein the processor is further configured to select the offset after the flow device is powered up.

11. The flow device of claim 3, further comprising:
    a memory, coupled to the processor, to store a plurality of offsets, each offset corresponding to a different orientation of the at least four distinct orientations of the flow sensor relative to the reference direction and a density of a particular type of fluid.

12. The flow device of claim 11, wherein the processor is configured to select an offset from the plurality of offsets based upon the orientation signal and the density of the particular type of fluid, and adjust the flow signal based upon the selected offset to determine the corrected flow rate of the fluid.

13. The flow device of claim 1, wherein the flow device includes a printed circuit board, and wherein the processor and the orientation sensor are disposed on the printed circuit board.

14. The flow device of claim 1, wherein the flow device is a mass flow controller, the flow device further comprising:
    a valve, disposed between the fluid inlet and the fluid outlet and in fluid communication with the flow sensor;
    wherein the processor is further configured to receive a setpoint indicative of a desired flow rate of the fluid to be provided by the fluid outlet, compare the setpoint to an indicated flow rate of the fluid being provided by the fluid outlet, and provide a valve drive signal to the valve based upon a difference between the setpoint and the indicated flow rate.

15. The flow device of claim 14, wherein the indicated flow rate is based upon the flow signal and the valve drive signal is based upon the difference between the setpoint and the indicated flow rate and upon the orientation signal.

16. The flow device of claim 15, wherein the orientation signal is determined after the flow device is powered up.

17. The flow device of claim 14, wherein the indicated fluid flow rate is based upon the corrected flow rate.

18. The flow device of claim 17, wherein the processor is further configured to receive the flow signal and the orientation signal, to filter the flow signal, and to determine the corrected flow rate of the fluid through the flow sensor based upon the filtered flow signal and the orientation signal.

19. The flow device of claim 18, wherein the processor is further configured to compare the sensed flow rate of the fluid through the flow sensor to a plurality of gas flow curves to generate a fitted flow signal, filter the fitted flow signal, and generate the indicated flow rate based upon the filtered fitted flow signal and the orientation signal.

20. The flow device of claim 19, wherein the orientation signal is determined after the flow device is powered up.

* * * * *